United States Patent
Stiles, Jr. et al.

(10) Patent No.: US 10,219,491 B2
(45) Date of Patent: Mar. 5, 2019

(54) DISSOLVED OXYGEN CONTROL SYSTEM FOR AQUACULTURE

(71) Applicants: Robert W. Stiles, Jr., Cary, NC (US); Dennis P. DeLong, Raleigh, NC (US); Thomas Losordo, Raleigh, NC (US)

(72) Inventors: Robert W. Stiles, Jr., Cary, NC (US); Dennis P. DeLong, Raleigh, NC (US); Thomas Losordo, Raleigh, NC (US)

(73) Assignee: Pentair Water Pool and Spa, Inc., Cary, NC (US)

(*) Notice: Subject to any disclaimer, the term of this patent is extended or adjusted under 35 U.S.C. 154(b) by 192 days.

(21) Appl. No.: 14/216,221

(22) Filed: Mar. 17, 2014

(65) Prior Publication Data
US 2014/0311416 A1 Oct. 23, 2014

Related U.S. Application Data

(60) Provisional application No. 61/787,983, filed on Mar. 15, 2013.

(51) Int. Cl.
*B64C 15/02* (2006.01)
*A01K 63/04* (2006.01)
(Continued)

(52) U.S. Cl.
CPC .......... *A01K 63/042* (2013.01); *A01K 63/006* (2013.01); *A01K 63/047* (2013.01);
(Continued)

(58) Field of Classification Search
CPC ...... A01K 63/00; A01K 63/003; A01K 63/04; A01K 63/047; A01K 63/045;
(Continued)

(56) References Cited

U.S. PATENT DOCUMENTS

| 299,515 A | 6/1884 | Brooks |
| 867,463 A | 10/1907 | Yingling |

(Continued)

FOREIGN PATENT DOCUMENTS

| CN | 201299045 Y | 9/2009 |
| CN | 201451050 U | 5/2010 |

(Continued)

OTHER PUBLICATIONS

International Search Report and Written Opinion issued in PCT/US2014/030465, dated Aug. 11, 2014, 16 pages.

(Continued)

*Primary Examiner* — Monica L Williams
*Assistant Examiner* — Christopher D Hutchens
(74) *Attorney, Agent, or Firm* — Quarles & Brady LLP

(57) ABSTRACT

Some embodiments provide a recirculating aquaculture system for aquatic life. The system includes a culture tank, a sensor configured to measure a current dissolved oxygen level in the culture tank, a variable speed pump configured to circulate water through the culture tank, and a controller in communication with the sensor and the variable speed pump. The controller is configured to retrieve a dissolved oxygen threshold level and a maximum gas to liquid ratio in the culture tank, retrieve the current dissolved oxygen level, compare the current dissolved oxygen level with the dissolved oxygen threshold level, and automatically increase one of a current water flow rate and a current oxygen flow through the system when the current dissolved oxygen level is less than the dissolved oxygen threshold level.

9 Claims, 8 Drawing Sheets

(51) Int. Cl.
  *A01K 63/00* (2017.01)
  *B01F 5/10* (2006.01)
  *B01F 15/00* (2006.01)
  *B01F 15/04* (2006.01)

(52) U.S. Cl.
  CPC ........ *B01F 5/106* (2013.01); *B01F 15/00207* (2013.01); *B01F 15/0408* (2013.01); *B01F 15/0416* (2013.01)

(58) Field of Classification Search
  CPC .................. A01K 63/042; A01K 61/10; B01D 2257/104; C02F 3/02; C02F 3/025
  See application file for complete search history.

(56) References Cited

U.S. PATENT DOCUMENTS

| | | | |
|---|---|---|---|
| 3,915,589 A | 10/1975 | Vander Linden | |
| 3,971,338 A * | 7/1976 | Alexson | A01K 63/04 119/262 |
| 4,030,450 A | 6/1977 | Hoult | |
| 4,119,495 A | 10/1978 | Belyaev et al. | |
| 4,203,389 A | 5/1980 | Gasper, Jr. et al. | |
| 4,271,099 A | 6/1981 | Kukla | |
| 4,284,900 A | 8/1981 | Botts | |
| 4,359,984 A | 11/1982 | Nakao | |
| 4,398,937 A | 8/1983 | van Aller et al. | |
| 4,473,970 A | 10/1984 | Hills | |
| 4,522,727 A | 6/1985 | Weber | |
| 4,654,147 A | 3/1987 | Bagley | |
| 4,664,680 A * | 5/1987 | Weber | A01K 63/042 261/19 |
| 4,749,493 A | 6/1988 | Hicks | |
| 4,765,807 A | 8/1988 | Henriksen | |
| 4,913,093 A | 4/1990 | VanGorder | |
| 4,926,795 A | 5/1990 | Hamilton et al. | |
| 4,975,106 A | 12/1990 | Ferguson | |
| 5,013,429 A | 5/1991 | Krofta | |
| 5,038,715 A | 8/1991 | Fahs, II | |
| 5,055,186 A | 10/1991 | Van Toever | |
| 5,081,954 A * | 1/1992 | Monus | A01K 63/04 119/260 |
| 5,121,708 A | 6/1992 | Nuttle | |
| 5,133,287 A | 7/1992 | Hicks | |
| 5,137,432 A * | 8/1992 | Tsai | A01K 63/047 181/232 |
| 5,139,791 A | 8/1992 | Nakajima et al. | |
| 5,158,037 A | 10/1992 | Engelbart | |
| 5,165,925 A | 11/1992 | Leong | |
| 5,178,093 A | 1/1993 | Reese et al. | |
| 5,206,243 A | 4/1993 | Hofmann et al. | |
| 5,215,767 A | 6/1993 | Mitsuhashi | |
| 5,227,055 A | 7/1993 | Timmons | |
| 5,320,068 A | 6/1994 | Redditt | |
| 5,337,698 A | 8/1994 | Widmyer | |
| 5,397,466 A | 3/1995 | Lin | |
| 5,445,740 A | 8/1995 | Malone | |
| 5,458,779 A | 10/1995 | Odegaard | |
| 5,482,630 A | 1/1996 | Lee et al. | |
| 5,540,555 A | 7/1996 | Corso et al. | |
| 5,543,039 A | 8/1996 | Odegaard | |
| 5,556,536 A | 9/1996 | Turk | |
| 5,593,574 A | 1/1997 | Van Toever | |
| 5,593,600 A | 1/1997 | Solomon | |
| 5,596,947 A | 1/1997 | Creppel et al. | |
| 5,636,595 A | 6/1997 | Lunde et al. | |
| 5,711,983 A | 1/1998 | Kyle et al. | |
| 5,728,287 A | 3/1998 | Hough et al. | |
| 5,732,655 A | 3/1998 | Baba et al. | |
| 5,747,311 A | 5/1998 | Jewell | |
| 5,762,024 A | 6/1998 | Meilahn | |
| 5,770,080 A | 6/1998 | Malone | |
| 5,780,448 A | 7/1998 | Davis | |
| 5,820,759 A | 10/1998 | Stewart et al. | |
| 5,839,391 A | 11/1998 | Shaar | |
| 5,868,940 A | 2/1999 | Gurfinkel | |
| 5,884,585 A | 3/1999 | Streichenberger | |
| 5,893,337 A * | 4/1999 | Sevic | A01K 63/042 119/215 |
| 5,906,750 A | 5/1999 | Haase | |
| 5,945,171 A | 8/1999 | Cook | |
| 5,961,831 A | 10/1999 | Lee et al. | |
| 5,970,917 A | 10/1999 | Keith, Jr. | |
| 5,978,315 A | 11/1999 | Molaug | |
| 5,979,363 A | 11/1999 | Shaar | |
| 6,015,497 A | 1/2000 | Steen, Jr. | |
| 6,016,770 A | 1/2000 | Fisher | |
| 6,017,020 A | 1/2000 | Baughman et al. | |
| 6,024,875 A | 2/2000 | Sevic | |
| 6,027,700 A | 2/2000 | Ishioka et al. | |
| 6,065,245 A | 5/2000 | Seawright | |
| 6,083,405 A | 7/2000 | Tanaka et al. | |
| 6,117,313 A | 9/2000 | Goldman et al. | |
| 6,117,383 A | 9/2000 | Kirschbaum | |
| 6,117,457 A | 9/2000 | Devos et al. | |
| 6,123,846 A | 9/2000 | Kikuchi | |
| 6,126,829 A | 10/2000 | Gunnarsson et al. | |
| 6,155,794 A | 12/2000 | Wu | |
| 6,171,469 B1 | 1/2001 | Hough et al. | |
| 6,171,480 B1 | 1/2001 | Lee et al. | |
| 6,180,614 B1 | 1/2001 | Davis | |
| 6,192,833 B1 | 2/2001 | Brune et al. | |
| 6,209,855 B1 * | 4/2001 | Glassford | B01F 3/04269 210/150 |
| 6,231,769 B1 | 5/2001 | Pean et al. | |
| 6,244,218 B1 | 6/2001 | NcNeil | |
| 6,253,227 B1 | 6/2001 | Tompkins et al. | |
| 6,325,020 B1 | 12/2001 | Guigne et al. | |
| 6,325,842 B1 | 12/2001 | Caldwell et al. | |
| 6,379,546 B1 | 4/2002 | Braun | |
| 6,382,601 B1 * | 5/2002 | Ohnari | B01F 3/0446 261/123 |
| 6,391,201 B1 | 5/2002 | Pelz | |
| 6,398,840 B1 | 6/2002 | Orta-Castro et al. | |
| 6,422,066 B1 | 7/2002 | Cordonnier et al. | |
| 6,428,710 B1 | 8/2002 | Kempen et al. | |
| 6,443,097 B1 | 9/2002 | Zohar et al. | |
| 6,447,681 B1 | 9/2002 | Carlberg et al. | |
| 6,451,612 B1 | 9/2002 | Camp et al. | |
| 6,461,590 B2 | 10/2002 | Spears | |
| 6,474,264 B1 | 11/2002 | Grimberg et al. | |
| 6,499,431 B1 | 12/2002 | Lin et al. | |
| 6,510,815 B1 | 1/2003 | Lagardere | |
| 6,517,724 B1 | 2/2003 | Malone | |
| 6,546,962 B1 * | 4/2003 | Sunde | E21B 43/16 137/893 |
| 6,557,492 B1 | 5/2003 | Robohm | |
| 6,581,543 B1 | 6/2003 | Kolberg | |
| 6,584,935 B2 | 7/2003 | Zohar et al. | |
| 6,630,067 B2 | 10/2003 | Shieh et al. | |
| 6,638,434 B2 * | 10/2003 | Otsuki | C02F 1/74 210/748.08 |
| 6,649,412 B1 | 11/2003 | Borggaard et al. | |
| 6,676,837 B2 | 1/2004 | Keeton, Jr. | |
| 6,677,861 B1 | 1/2004 | Henry et al. | |
| 6,722,314 B1 | 4/2004 | Crisinel et al. | |
| 6,798,347 B2 | 9/2004 | Henry et al. | |
| 6,827,036 B2 | 12/2004 | Connolly | |
| 6,849,189 B2 | 2/2005 | Curlee et al. | |
| 6,928,864 B1 | 8/2005 | Henry et al. | |
| 6,936,170 B2 | 8/2005 | Shieh et al. | |
| 6,938,506 B2 | 9/2005 | Henry et al. | |
| 6,946,074 B2 | 9/2005 | Malmqvist et al. | |
| 6,986,323 B2 | 1/2006 | Ayers | |
| 7,004,109 B2 | 2/2006 | Olive et al. | |
| 7,007,541 B2 | 3/2006 | Henry et al. | |
| 7,029,577 B2 | 4/2006 | Cummins | |
| 7,052,601 B2 | 5/2006 | Gravdal | |
| 7,063,855 B2 | 6/2006 | Hjaltason et al. | |
| 7,067,145 B2 | 6/2006 | Place et al. | |
| 7,082,893 B2 | 8/2006 | Schreier et al. | |
| 7,138,926 B2 | 11/2006 | Henry et al. | |
| 7,156,048 B2 | 1/2007 | Olive et al. | |
| 7,166,211 B1 | 1/2007 | Boyd | |

(56) References Cited

U.S. PATENT DOCUMENTS

| | | | |
|---|---|---|---|
| 7,175,683 B2 | 2/2007 | Cabello-Fuentes | |
| 7,189,323 B2 | 3/2007 | Lofqvist et al. | |
| 7,258,790 B2 | 8/2007 | Brune et al. | |
| 7,318,901 B2 | 1/2008 | Naess et al. | |
| 7,462,284 B2 | 12/2008 | Schreier et al. | |
| 7,484,476 B2 | 2/2009 | Stafford | |
| 7,517,459 B2 | 4/2009 | Des Aulniers | |
| 7,533,874 B2 | 5/2009 | Glomset | |
| 7,597,805 B2 | 10/2009 | Danielsson et al. | |
| 7,624,703 B2 | 12/2009 | Vago | |
| 7,631,615 B1* | 12/2009 | Mast | A01K 63/042 119/211 |
| 7,654,728 B2 | 2/2010 | Wood et al. | |
| 7,702,473 B2 | 4/2010 | Widder et al. | |
| 7,770,814 B2 | 8/2010 | Archambeau et al. | |
| 7,806,584 B2 | 10/2010 | Wootan et al. | |
| 7,807,201 B2 | 10/2010 | Jeong et al. | |
| 7,832,920 B2 | 11/2010 | Wood et al. | |
| 7,845,913 B2 | 12/2010 | Stiles, Jr. et al. | |
| 7,854,597 B2 | 12/2010 | Stiles, Jr. | |
| 7,879,809 B2 | 2/2011 | Dick et al. | |
| 7,887,698 B2 | 2/2011 | Wood | |
| 7,910,001 B2 | 3/2011 | Michaels, II et al. | |
| 7,919,534 B2 | 4/2011 | Wood et al. | |
| 7,947,100 B1 | 5/2011 | Thomas et al. | |
| 7,947,172 B2 | 5/2011 | Aulniers | |
| 7,997,564 B2 | 8/2011 | Wu | |
| 8,349,191 B2* | 1/2013 | Wood | A01K 63/042 119/226 |
| 8,404,117 B1* | 3/2013 | Steinbrueck | C02F 1/008 210/252 |
| 2002/0082727 A1 | 6/2002 | Laflamme et al. | |
| 2002/0150476 A1 | 10/2002 | Lucke et al. | |
| 2002/0179524 A1 | 12/2002 | Malmqvist et al. | |
| 2003/0034284 A1 | 2/2003 | Wolfe | |
| 2003/0061004 A1 | 3/2003 | Discenzo | |
| 2003/0196942 A1 | 10/2003 | Jones | |
| 2004/0016241 A1 | 1/2004 | Street et al. | |
| 2004/0055960 A1 | 3/2004 | Mcneill | |
| 2004/0107914 A1 | 6/2004 | Untermeyer et al. | |
| 2004/0117330 A1 | 6/2004 | Ehlers et al. | |
| 2004/0129619 A1 | 7/2004 | Leach | |
| 2005/0029178 A1 | 2/2005 | Haddas | |
| 2005/0047270 A1* | 3/2005 | Wood | A01K 63/042 366/170.3 |
| 2005/0072732 A1 | 4/2005 | Lofqvist et al. | |
| 2005/0123408 A1 | 6/2005 | Koehl | |
| 2005/0199028 A1 | 9/2005 | Shin | |
| 2005/0226731 A1 | 10/2005 | Mehlhorn et al. | |
| 2005/0275119 A1* | 12/2005 | Glomset | A01K 63/042 261/76 |
| 2006/0011555 A1 | 1/2006 | Aulniers | |
| 2006/0054554 A1 | 3/2006 | Spears et al. | |
| 2006/0132762 A1 | 6/2006 | Kirkpatrick et al. | |
| 2006/0191828 A1 | 8/2006 | Cummins | |
| 2006/0237044 A1 | 10/2006 | Ferguson et al. | |
| 2007/0108125 A1* | 5/2007 | Cho | C02F 3/1273 210/605 |
| 2007/0219652 A1 | 9/2007 | McMillan | |
| 2007/0227908 A1 | 10/2007 | Barnett | |
| 2007/0251461 A1 | 11/2007 | Reichard et al. | |
| 2008/0010894 A1* | 1/2008 | Stafford | A01K 63/042 43/57 |
| 2008/0041773 A1* | 2/2008 | Morse | B01F 3/0446 210/96.1 |
| 2008/0044293 A1 | 2/2008 | Hanke et al. | |
| 2009/0094765 A1 | 4/2009 | Osaka et al. | |
| 2009/0152192 A1 | 6/2009 | Michaels, II et al. | |
| 2010/0018931 A1 | 1/2010 | Aulniers | |
| 2010/0038286 A1 | 2/2010 | Greaney et al. | |
| 2010/0076380 A1* | 3/2010 | Hui | C12M 21/08 604/151 |
| 2010/0147690 A1* | 6/2010 | Audunson | B01F 3/04985 204/557 |
| 2010/0154717 A1 | 6/2010 | Glomset et al. | |
| 2010/0307545 A1 | 12/2010 | Osaka et al. | |
| 2011/0039321 A1 | 2/2011 | Tal et al. | |
| 2011/0066256 A1 | 3/2011 | Sesay et al. | |
| 2011/0290189 A1 | 12/2011 | Myers | |
| 2011/0290191 A1 | 12/2011 | Boer et al. | |
| 2011/0301531 A1 | 12/2011 | Spears et al. | |
| 2012/0063921 A1 | 3/2012 | Stiles, Jr. et al. | |
| 2012/0175308 A1 | 7/2012 | Jangbarwala et al. | |
| 2012/0211417 A1 | 8/2012 | Vegso et al. | |
| 2012/0325741 A1* | 12/2012 | Osborn | C02F 3/1268 210/620 |
| 2014/0245962 A1* | 9/2014 | Watsuji | A01K 63/042 119/263 |
| 2014/0263048 A1* | 9/2014 | Kasparian | C02F 3/006 210/630 |

FOREIGN PATENT DOCUMENTS

| | | |
|---|---|---|
| CN | 201917800 U | 8/2011 |
| CN | 201917803 U | 8/2011 |
| DE | 19909226 A1 | 1/2000 |
| EP | 1112680 A2 | 4/2001 |
| EP | 2159210 A2 | 3/2010 |
| EP | 2188211 A1 | 5/2010 |
| EP | 2139313 B1 | 10/2012 |
| GB | 2491085 A | 11/2012 |
| JP | 3157199 A | 7/1991 |
| JP | 3188999 A | 8/1991 |
| JP | 7170881 A | 7/1995 |
| JP | 11326312 A | 11/1999 |
| JP | 2006180829 A | 7/2006 |
| SU | 873999 A1 | 10/1981 |
| WO | 03099705 A2 | 12/2003 |
| WO | WO2008/131403 A1 | 10/2008 |
| WO | WO2009/013728 A1 | 1/2009 |
| WO | 2011150463 A1 | 12/2011 |
| WO | 2011156517 A1 | 12/2011 |
| WO | 2013051604 A1 | 4/2013 |
| WO | 2014152926 A1 | 9/2014 |

OTHER PUBLICATIONS

Ghaly et al., "Desalination of Saline Sludges Using Ion-Exchange Column with Zeolite", American Journal of Environmental Sciences 4 (4), 2008, pp. 388-396, Department of Process Engineering and Applied Sciences, Dalhousie University, Halifax, Nova Scotia, B3J 2X4, Canada.

Chen et al., "Aquaculture Sludge Treatment Using an Anaerobic and Facultative Lagoon System", pp. 1-10.

Lindell et al. "Effluent Treatment and Residuals Management Using Land Application to Recycle Nutrients from a Large-Scale Recirculating Aquaculture Facility", One (1) Page.

Twarowka et al., "Water Treatment and Waste Characterization Evaluation of an Intensive Recirculating Fish Production System", pp. 1-12.

Easter et al., "Waste Characterization and Disposal from a Recirculating Aquaculture System Producing Hybrid Striped Bass", pp. 1-6.

Adler et al., "Conveyor Production Strategy Enhances Nutrient Byproduct Recovery from Aquaculture Wastewater", pp. 1-11.

Duangpaseuth et al., " Seafood Processing", Term Project 2, ED78. 20 Industrial Waste Abatement and Management, Asian Institute of Technology, pp. 1-24.

Falk et al, "Wastewater Technology Fact Sheet Chemical Precipitation", United States Environmental Protection Agency, Office of Water, Sep. 2000, EPA 832-F-00-018, 8 pages.

Robert S. Carrow, Variable Frequency Drives, Electrician's Technical Reference (published by Delmar) dated 2001.

Danfoss VLT8000 Aqua Instruction Manual, dated Apr. 16, 2004.

Product Focus—New AC Drive Series Targets Water, Wastewater Applications, WaterWorld Magazine, vol. 8 No. 7, dated Jul. 2002.

Pentair IntelliTouch Operating Manual dated May 22, 2003.

Pentair RS-485 Pool Controller Adapter Published Advertisement from Pool and Spa News, dated Mar. 22, 2002.

(56) References Cited

OTHER PUBLICATIONS

Compool CP3800 Pool-Spa Control System Installation and Operating Instructions, dated Nov. 7, 1997.
Hayward Owner's Guide, Pro-Series High-Rate Sand Filter, dated 2002.
Summerfelt: Oxygenation and carbon dioxide control in water reuse system, Aquacultural Engineering 22(1-2): 87-108, 2000, retrieved Jun. 30, 2014, 22 pages.
Aquatic Eco-Systems Inc., Sales Brochure entitled, "Recirculating Aquaculture Systems," 8 pages.
RK2, Systems Product List, 1 page.
In-Situ Aquaculture, AquaTROLL 400 Multiparameter Instrument Brochure, 2 pages.
Hydrotech AB, Hydrotech Filters Brochure, 4 pages.
Thomas M. Losordo, Michael Masser and James E. Rakocy, Southern Regional Aquaculture Center, "Recirculating Aquaculture Tank Production Systems" Apr. 1999, 12 pages.
United Food Technologies AG, UFT-Denitrification Equipment Brochure, 2 pages.
United Food Technologies AG, UFT-Aquaculture Automation Brochure, 2 pages.
Aquasonic PTY Ltd., Sweetwater Oxygen Cone Installation Guide, 2 pages.
The Linde Group, Aquaculture Equipment Portfolio, 12 pages.
Water Management Technologies, Inc., Micro Diffussers Brochure, 1 page.

\* cited by examiner

DISSOLVED OXYGEN CONTROL SYSTEM FOR AQUACULTURE

CROSS REFERENCE TO RELATED APPLICATIONS

This application claims the benefit of U.S. Provisional Patent Application No. 61/787,983 filed on Mar. 15, 2013, the entire contents of which is incorporated herein by reference.

BACKGROUND

Pumps may be used to recirculate water in aquatic farms, such as recirculating aquaculture systems in which fish and other aquatic life are raised. Recirculating aquaculture systems generally include one or more tanks to contain the fish, one or more water inlets into the tank(s), and one or more water outlets out of the tank(s). The water outlets are typically in communication with an inlet of a variable speed pump. The variable speed pump generally propels water through a filter and back into the tank through the water inlets.

Conventional recirculating aquaculture systems usually have a sizable upfront cost to design and build, and also have high operating costs that make it difficult for recirculating aquaculture farmers to compete with other types of aquaculture farms, such as ponds and net pen operations. Conventional recirculating aquaculture systems usually provide manually adjusted oxygen flow into a culture tank and manually adjusted water flow through the culture tank, depending upon the size or requirements of the aquatic life. As a result, typical recirculating aquaculture farms usually spend anywhere from about $50,000 to about $500,000 in electrical costs and about $12,000 to about $100,000 in oxygen costs on an annual basis. In fact, usually the highest operating costs for recirculating aquaculture farms are generally feed, electricity, and oxygen.

In conventional recirculating aquaculture systems, there are several parameters that are typically frequently monitored by the farmers in order to determine when feed rates for the fish may be increased. Presently, aquaculture farmers monitor ammonia and nitrogen output of the fish daily (by measuring the concentration of ammonia and nitrogen in the culture tank). In particular, the farmers monitor the amount of feed the fish may consume over a time period of about every 30 minutes to about 2 hours. In addition, the farmers monitor oxygen consumption of the fish and oxygen level of the water in the system constantly.

In light of the above issues, a need exists for a way in which to lower the production cost and operating cost of recirculating aquaculture systems.

SUMMARY

Some embodiments provide a method of operating a pump in an aquaculture system, which includes a culture tank that houses aquatic life. The method includes retrieving a dissolved oxygen threshold concentration and a maximum gas to liquid ratio in a degasser, retrieving a current dissolved oxygen level, and comparing the current dissolved oxygen level with the dissolved oxygen threshold concentration. The method also includes the step of increasing one of a current water flow rate and a current oxygen flow rate when the current dissolved oxygen level is less than the dissolved oxygen threshold concentration.

Other embodiments provide a recirculating aquaculture system for aquatic life. The system includes a culture tank, a sensor configured to measure a current dissolved oxygen level in the culture tank, a variable speed pump configured to circulate water through the culture tank, and a controller in communication with the sensor and the variable speed pump. The controller is configured to retrieve a dissolved oxygen threshold concentration and a maximum gas to liquid ratio in the culture tank, retrieve the current dissolved oxygen level, compare the current dissolved oxygen level with the dissolved oxygen threshold concentration, and increase one of a current water flow rate and a current oxygen flow rate when the current dissolved oxygen level is less than the dissolved oxygen threshold concentration.

Further embodiments provide a method for controlling dissolved oxygen in an aquaculture system including a culture tank that houses aquatic life. The method includes retrieving a dissolved oxygen threshold concentration and a maximum gas to liquid ratio, measuring a current dissolved oxygen level, and comparing the current dissolved oxygen level with the dissolved oxygen threshold concentration. When the current dissolved oxygen level is less than the dissolved oxygen threshold concentration, a current gas to liquid ratio is calculated using a current water flow rate and a current oxygen flow rate and the current water flow rate is increased by increasing a speed of a variable speed pump when the current gas to liquid ratio is greater than the maximum gas to liquid ratio. The method also includes the step of increasing the current oxygen flow rate when the current gas to liquid ratio is less than the maximum gas to liquid ratio. The method further provides for waiting a predetermined time period, then proceeding to measure a current dissolved oxygen level and repeating the method.

These and other aspects of the invention will become apparent in light of the following detailed description.

DETAILED DESCRIPTION

Figure 1:
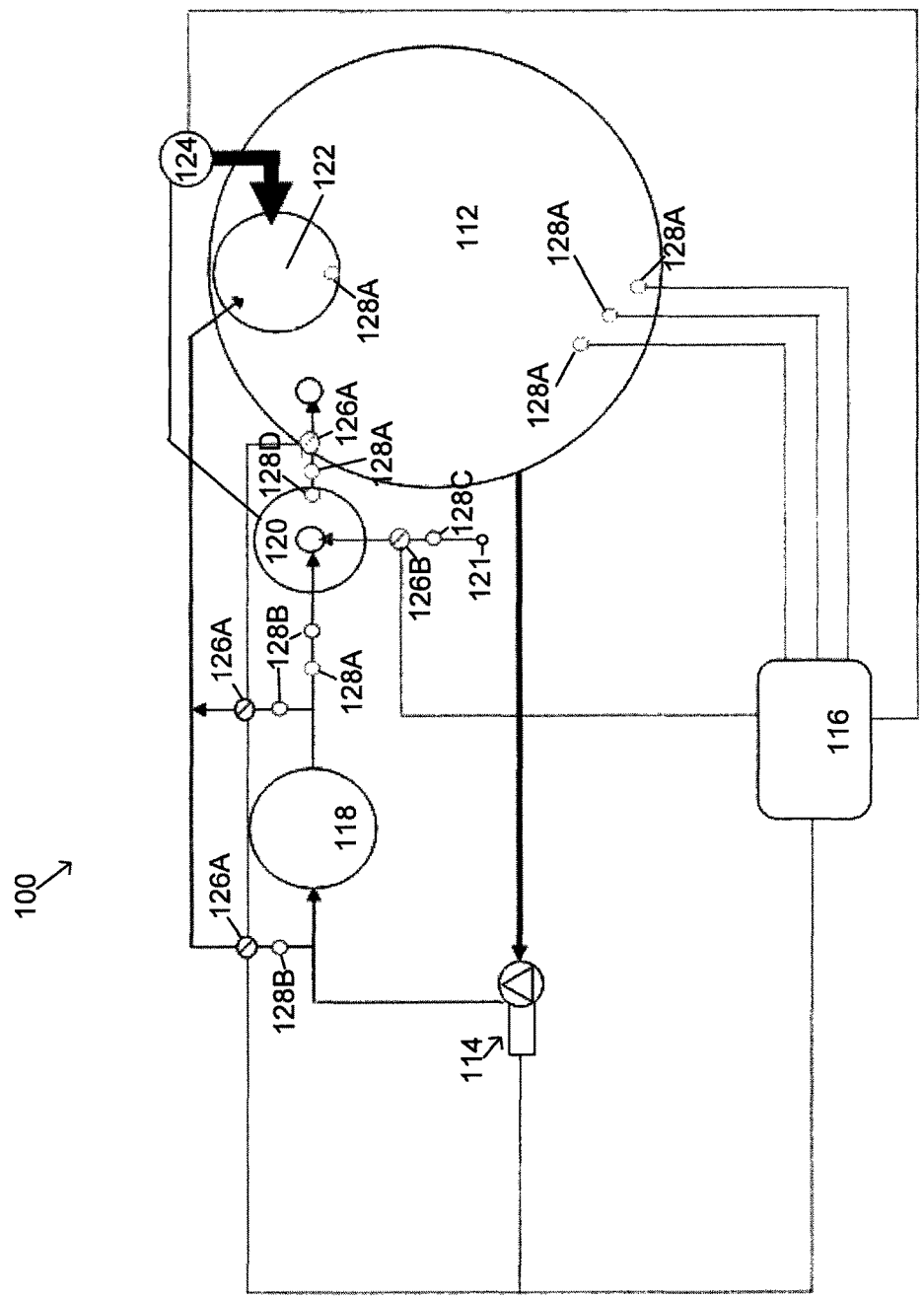
FIG. 1 is a schematic view of an aquaculture system according to one embodiment.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein may be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Embodiments of the present disclosure provide systems and methods for operating a pump in an aquaculture recirculation system. Aquaculture recirculation systems include components and methods to support aquatic life including one or more of a culture tank, a water pump, a method of removing solid waste, a method of nitrification, and a method of gas exchange. In the present disclosure, the aquaculture system includes systems and methods for providing an efficient method of gas exchange. Aquatic life consume oxygen and produce carbon dioxide in molar equivalents during respiration. Specifically, the system disclosed herein is directed to monitoring the water quality for proper gas exchange, monitoring the dissolved oxygen as compared to a dissolved oxygen threshold concentration, and adjusting one or more system parameters to maintain a sustainable and healthy aquatic environment for the aquatic life.

FIG. 1 illustrates an aquaculture system 100 according to one embodiment. The aquaculture system 100 may include one or more culture tanks 112 capable of housing aquatic life, a variable speed pump 114, a controller 116, a biofilter 118, an oxygen cone 120, an oxygen gas inlet 121, a degasser 122, an air blower 124, a plurality of control valves 126, and a plurality of sensors 128.

Figure 2:
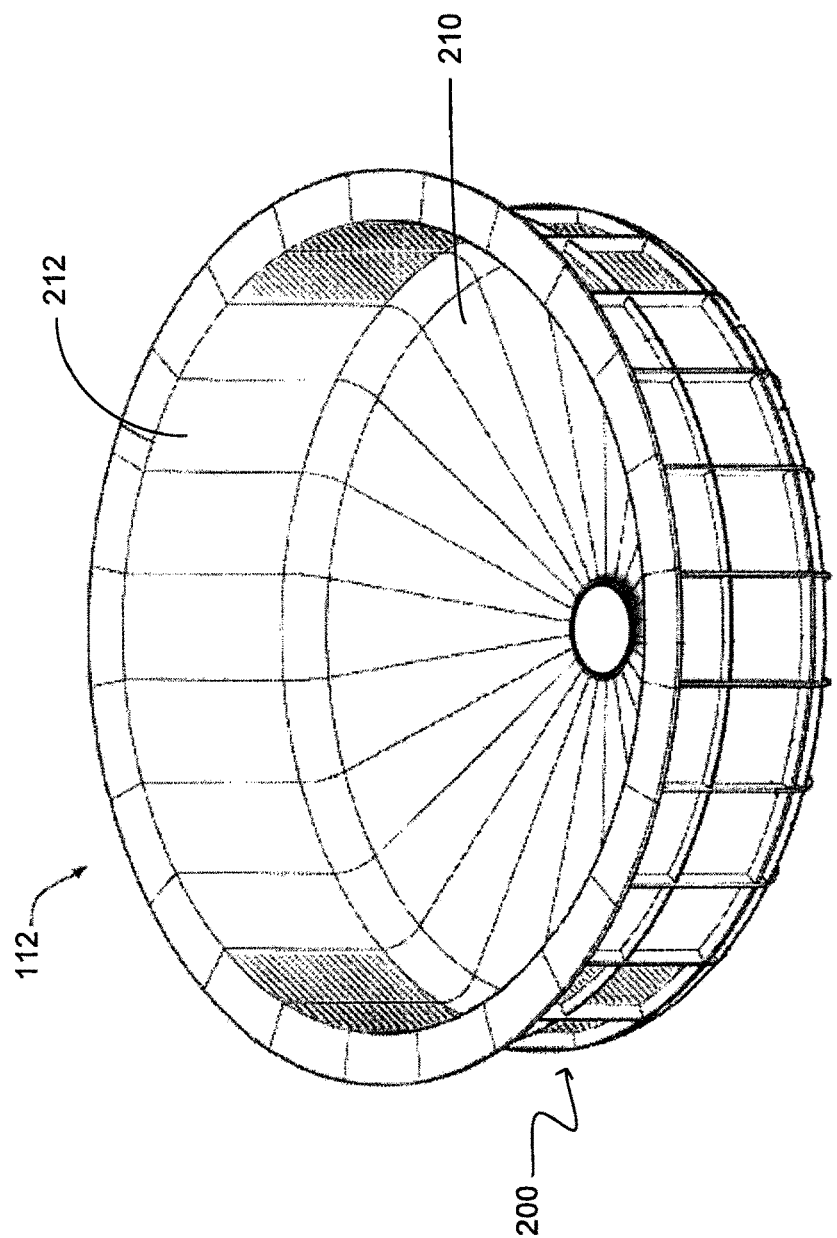
FIG. 2 is an isometric view of a culture tank for use in the system of FIG. 1.

As depicted in FIG. 2, the culture tank 112 is designed to support and hold aquatic life and is provided in the form of a substantially cylindrical container 200 defined by a bottom surface 210 and a cylindrical sidewall 212 extending upwardly from the bottom surface 210. Although a specific culture tank 112 is depicted in FIG. 2, other culture tanks 112 may be used consistent with the functions described herein. Additionally, one or more culture tanks 112 may be provided in parallel and/or in series, or otherwise be in communication with each other to form the aquaculture system 100.

One or more portions of the culture tank 112 may be made of suitable materials that are inert and not reactive with water. For example, one or more portions of the culture tank 112 may be constructed of metal, vinyl, polymer, glass, fiberglass, steel, concrete, ceramic, wood, or of any combination thereof. One or more portions of the culture tank 112 may be constructed of clear materials, translucent materials, opaque materials, and/or of any combination thereof. The culture tank 112 may be configured to be circular, octagonal, rectangular, polygonal, irregular, D-shaped, crescent-shaped, or any combination thereof. In some embodiments, the culture tank 112 may include a cover (not shown) that includes portions that are clear, light filtering, light blocking, translucent, and/or combinations thereof.

The culture tank 112 is in fluid communication with the variable speed pump 114. The variable speed pump 114 provides circulation of water within the culture tank 112 by moving slower water from the bottom of the tank where carbon dioxide is rich. The variable speed pump 114 may have any suitable construction and/or configuration for providing the desired force to move the water. In one embodiment, the variable speed pump 114 is a common centrifugal pump of the type known to have impellers extending radially from a central axis. Vanes defined by the impellers create interior passages through which the water passes as the impellers are rotated. Rotating the impellers about the central axis imparts a centrifugal force on water therein, and thus imparts the force flow to the water. A return line directs the return flow of water to the culture tank 112. Although centrifugal pumps are well suited to pump a large volume of water at a continuous rate, other motor-operated pumps may also be used within the scope of the present invention.

Figure 3:
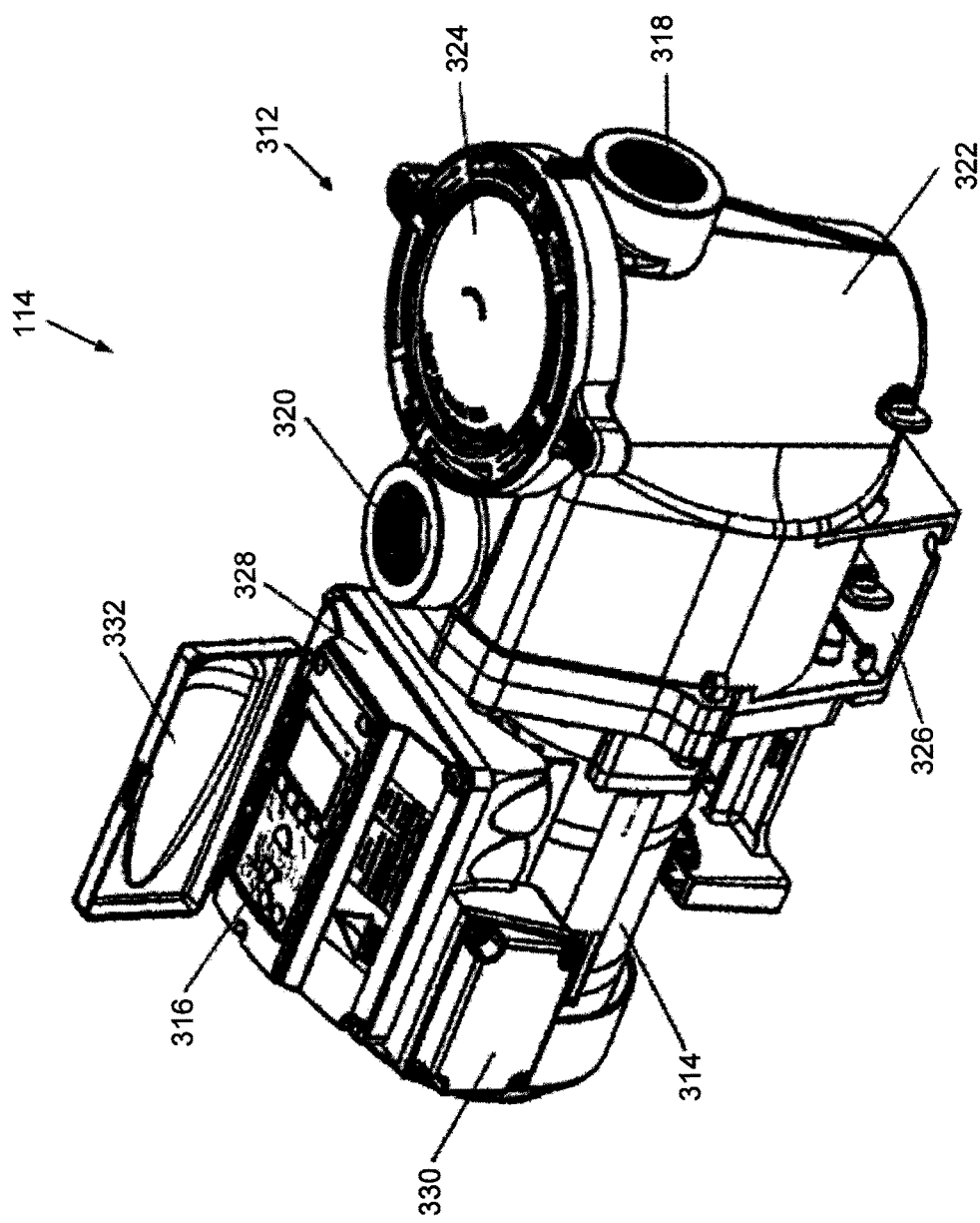
FIG. 3 is an isometric view of a variable speed pump for use in the system of FIG. 1.
Figure 4:
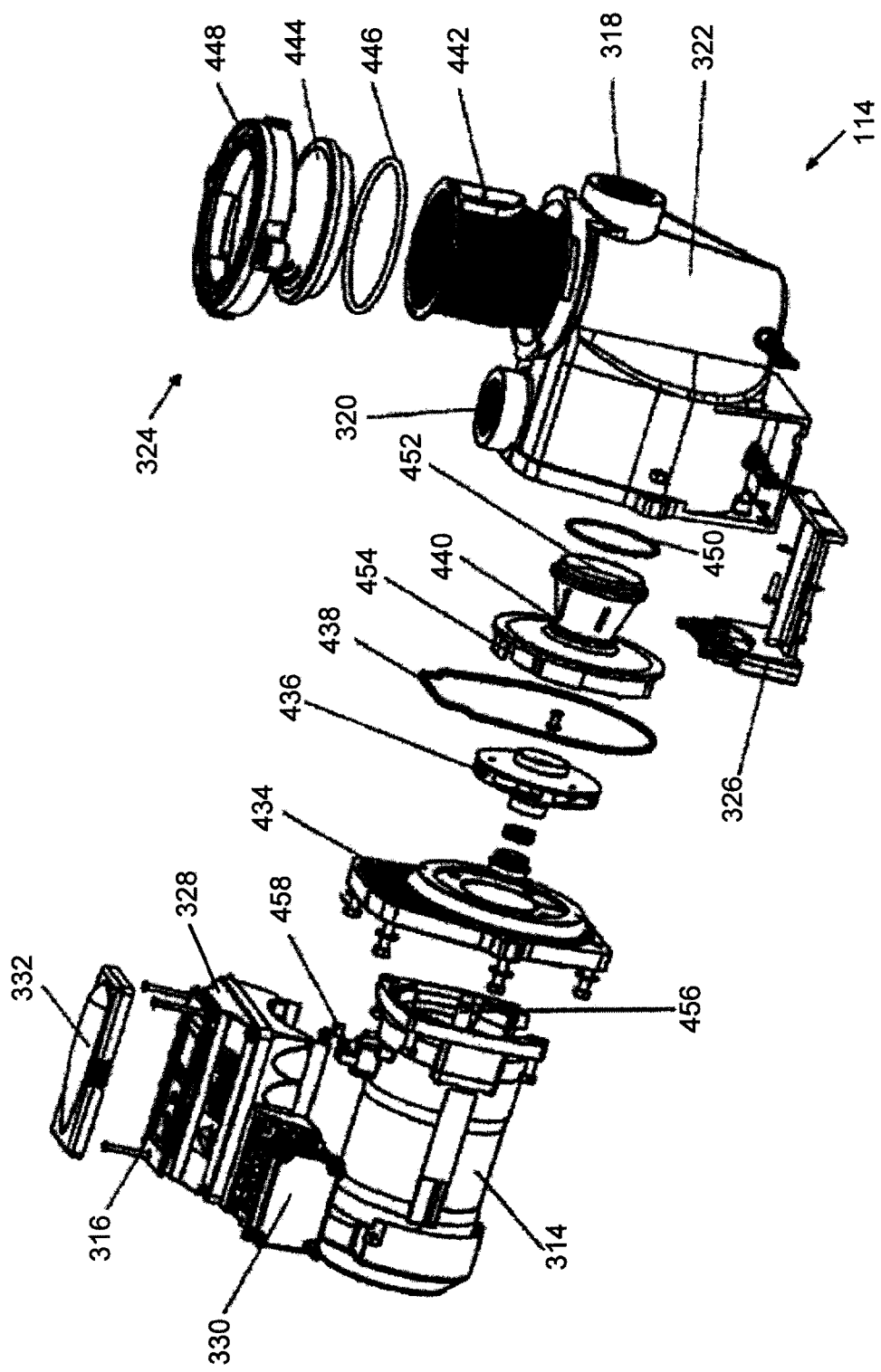
FIG. 4 is an exploded isometric view of the variable speed pump of FIG. 3.

FIGS. 3 and 4 illustrate an embodiment of the variable speed pump 114 for use with the aquaculture system 100. The variable speed pump 114 may include a housing 312, a motor 314, and a controller 316 (which may include a variable frequency drive controller). The housing 312 may include an inlet 318 for receiving water, an outlet 320 for expelling water, a basket 322, a lid 324, and a stand 326.

FIG. 4 depicts the internal components of the variable speed pump 114 according to one embodiment. The variable speed pump 114 may include a seal plate 434, an impeller 436, a gasket 438, a diffuser 440, and a strainer 442. The strainer 442 may be inserted into the basket 322 and may be secured by the lid 324. In some embodiments, the lid 324 may include a cap 444, an O-ring 446, and a nut 448. The cap 444 and the O-ring 446 may be coupled to the basket 322 by screwing the nut 448 onto the basket 322. The O-ring 446 may seal the connection between the basket 322 and the lid 324. An inlet 452 of the diffuser 440 may be fluidly sealed to the basket 322 with a seal 450. In some embodiments, the diffuser 440 may enclose the impeller 436. An outlet 454 of the diffuser 440 may be fluidly sealed to the seal plate 434 and the seal plate 434 may be sealed to the housing 312 with the gasket 438. The motor 314 may include a shaft 456, which may be coupled to the impeller 436. The motor 314 may rotate the impeller 436, drawing fluid from the inlet 318 through the strainer 442 and the diffuser 440 to the outlet 320.

Still referring to FIG. 4, drive force is provided to the variable speed pump 114 via the variable speed pump motor 314. In one example, the drive force is provided in the form of rotational force provided to rotate the impeller 436 of the variable speed pump 114. In one specific embodiment, the variable speed pump motor 314 is a permanent magnet motor. In another specific embodiment, the variable speed pump motor 314 is a three-phase motor. The variable speed pump motor 314 operation is infinitely variable within a range of operation (i.e., zero to maximum operation). In one specific example, the operation is indicated by the RPM of the rotational force provided to rotate the impeller 436 of the variable speed pump 114. In one embodiment, the motor 314 may be driven at four or more different speeds. In one embodiment, the motor may range from about ½ hp to about 11 hp, or more than about 11 hp. The stand 326 may support the motor 314 and may be used to mount the variable speed pump 114 on a suitable surface (not shown).

As shown in FIG. 4, the motor 314 may include a coupling 458 used to connect to the controller 316. The controller 316 may be associated with the variable speed pump 114, or may be provided separately (e.g., the controller 116). Each of the controllers discussed herein may be designed to control one or more operations and/or parameters of the aquaculture system 100, alone, or in conjunction with each other. In some embodiments, the controller 316 may automatically operate the variable speed pump 114 according to at least one schedule (e.g., an on-peak schedule, an off-peak schedule, a feeding schedule, an aquatic life rest schedule, etc.). In additional embodiments, the controller 316 may allow a manual operation of the variable speed pump 114. In other embodiments, the controller 316 may monitor the operation of the variable speed pump 114 and may indicate abnormal conditions of the variable speed pump 114 (i.e., through audible or visual alarms). In some embodiments, the controller 316 is configured within aquaculture system 100 to operate simultaneously or in conjunction with another controller 116. In other embodiments, the controllers 116 and 316 are configured within the aquaculture system 100 to operate independently. In yet other embodiments, at least one of controller 316 may be configured as an operating component of the aquaculture system 100.

The controller 316 may be enclosed in a case 328 (see FIGS. 3 and 4). The case 328 may include a field wiring compartment 330 and a cover 332. The cover 332 may be opened and closed to allow access to the controller 316 and protect the controller 316 from moisture, dust, and other environmental influences. The case 328 may be mounted on the motor 314 and/or another portion of the pump 104. In some embodiments, the field wiring compartment 330 and/or another portion of the pump 114, and may include a power supply (not shown) to provide power to the motor 314 and the controller 316.

Generally, the controllers 116 and/or 316 may adjust the speed of the variable speed pump 114 to maintain a desired flow through the system. More specifically, the variable speed pump 114 may be operated by the controllers 116 and/or 316 according to a flow control algorithm, as disclosed in U.S. Pat. No. 7,845,913 entitled "Flow Control" and issued Dec. 7, 2010, the entire contents of which is herein incorporated by reference. In addition, in some embodiments, the controllers 116 and/or 316 may be in two-way communication with the biofilter 118, one or more of the sensors 128, and/or one or more of the control valves 126. Two-way communication in the aquaculture system 100 may be performed as disclosed in U.S. Pat. No. 7,854,597 entitled "Pumping System with Two-Way Communication" and issued on Dec. 21, 2010, the entire contents of which is herein incorporated by reference in its entirety.

The controllers 116 and/or 316 may comprise a processor and memory interconnected with the processor via a communication link. An optional RFID module may be interconnected with the processor via a second communication link, and/or an optional "WI-FI" module interconnected with the processor via a third communication link. In some embodiments, microcode, instructions, databases, and/or combinations thereof are encoded in the memory. In certain embodiments, the memory comprises non-volatile memory. In certain embodiments, the memory comprises battery backed up RAM, a magnetic hard disk assembly, an optical disk assembly, an electronic memory, or combinations thereof. The term "electronic memory," can include one or more of a PROM, EPROM, EEPROM, SMARTMEDIA, FLASHMEDIA, and other suitable chips or memory devices.

The processor may use the microcode to operate the controllers 116 and/or 316 (independently or in tandem). The processor may use microcode, instructions, databases, and combinations thereof to operate the variable speed pump 114, the biofilter 118, the oxygen cone 120, the oxygen gas inlet 121, the degasser 122, the air blower 124, the plurality of control valves 126, the plurality of sensors 128, or combinations thereof.

The controllers 116 and/or 316 may monitor one or more parameters of the system and may automatically execute necessary actions (e.g., adjusting water flow rates, air flow rates, the control valves 126, etc.) to ensure optimal aquatic life conditions within the culture tank 112. Furthermore, the controllers 116 and/or 316 may execute one or more actions to reduce energy consumption of the system. More specifically, substantial costs of maintaining aquaculture systems generally include feed costs, electricity costs, oxygen costs, and combinations thereof. The controllers 116 and/or 316, either as a separate component from the variable speed pump 114 (i.e., the controller 116), or integrated into the variable speed pump 114 (i.e., the controller 316), may control components of the system (e.g., the variable speed pump 114, the blower 124, the control valves 126, combinations thereof, etc.) to maintain optimal aquatic life conditions in addition to minimizing electricity and oxygen costs.

For example, the controllers 116 and/or 316 may control the variable speed pump 114 to operate at a low speed to maintain a minimum water flow rate necessary to achieve optimal aquatic life conditions and may also increase the speed and, thus, water flow rate only when necessary (such as to increase dissolved oxygen levels during feeding). In contrast to conventional systems with single speed pumps that constantly run at a high speed, the variable speed pump 114 and the controllers 116 and/or 316 of the aquaculture system 100 may greatly minimize electricity and power consumption of the system. Furthermore, automatic execution of necessary actions to variably adjust water and oxygen/air flow may minimize electricity and power consumption in comparison to conventional systems. Moreover, the aquaculture system 100, including automatic control by the controllers 116 and/or 316, allows for rapid and efficient maintenance following startup since the typical learning curve of manual system operators is removed.

According to one embodiment, the controller 116 can provide automatic dissolved oxygen control for the system 100. Generally, when the dissolved oxygen level in the water is too low, the system 100 requires aeration and/or oxygenation. This can be accomplished by increasing water flow rate via the variable speed pump 114, oxygen flow through the system 100 (e.g., by increasing air flow through the degasser 122 via the blower 124 or increasing oxygen input via the oxygen cone 120 or an oxygenator). The controller 116 can determine which of these actions to execute based on a gas to liquid ratio (G:L) within the degasser 122. The controller 116 can calculate the G:L using the current water flow rate and the current air flow rate within the degasser 122. In one embodiment, the current water flow rate and the current air flow rate can be determined from sensors 128 within the system 100. In another embodiment, the current flow rate can be determined in a sensor-less manner by measuring characteristics of the variable speed pump 114.

Figure 5:
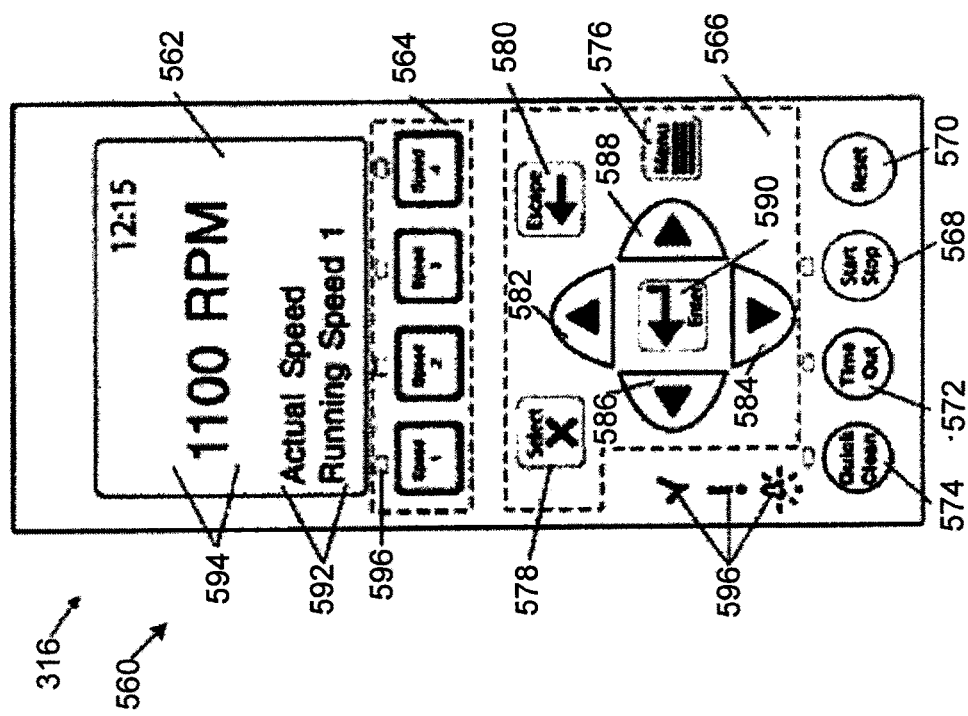
FIG. 5 is a front elevational view of a controller for use with the variable speed pump of FIG. 3.

FIG. 5 illustrates a user interface 560 for the controller 316 according to one embodiment of the invention. The user interface 560 is provided to allow a user to control one or more components, parameters, and/or methods associated with the aquaculture system 100. The user interface 560 may include a display 562, at least one speed button 564, one or more navigation buttons 566, a start-stop button 568, a reset button 570, a manual override button 572, and a "quick clean" button 574. The manual override button 572 may also be called a "time out" button. In some embodiments, the navigation buttons 566 may include a menu button 576, a select button 578, an escape button 580, an up-arrow button 582, a down-arrow button 584, a left-arrow button 586, a right-arrow button 588, and an enter button 590. The navigation buttons 566 and the speed buttons 564 may be used to program a schedule into the controller 316. In some embodiments, the display 562 may include a lower section 592 to display information about a parameter and an upper section 594 to display a value associated with that parameter. In some embodiments, the user interface 560 may include one or more light emitting diodes (LEDs) 596 to indicate normal operation and/or a detected error of the variable speed pump 114, and/or other operational components of the aquaculture system 100

Figure 6:
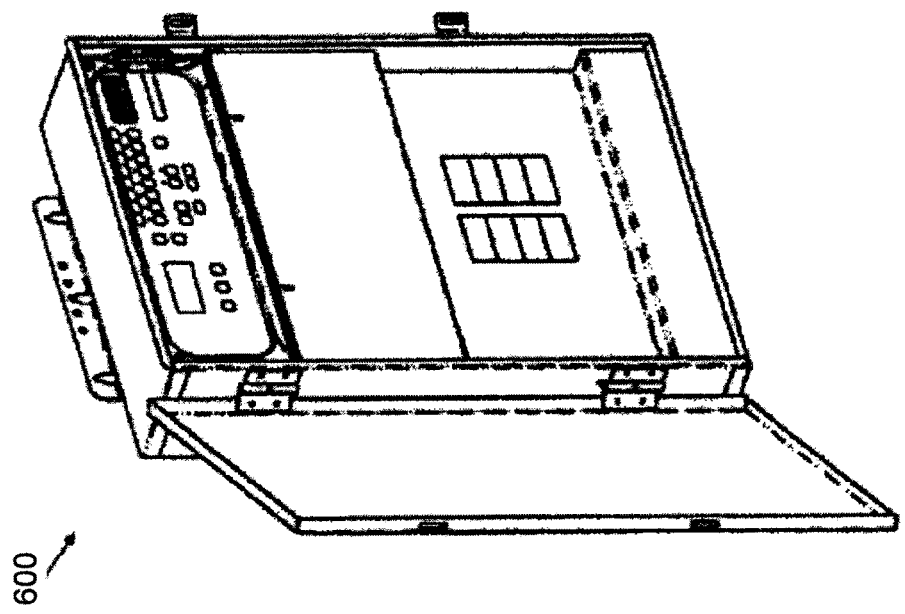
FIG. 6 is an isometric view of an external controller for use with the system of FIG. 1.

FIG. 6 illustrates an external controller 600 for the variable speed pump 114. The external controller 600 may communicate with the controllers 116 and 316. The external controller 600 may control the variable speed pump 114, and/or other components of the aquaculture system 100, in substantially the same way as described for the controllers 116 and 316. The external controller 600 may be used to operate the variable speed pump 114 and/or program the controllers 116 and 316, if the variable speed pump 114 is installed in a location where the user interface 560 is not conveniently accessible. The external controller 600 may include one or more of the buttons described herein and may be used to control one or more components, parameters, and/or methods associated with the aquaculture system 100, either as a standalone controller, or in conjunction with the on-board controller 316.

Returning again to the aquaculture system 100 shown in FIG. 1, the variable speed pump 114 is in fluid communication with the biofilter 118. Biological filtration and nitrification may be accomplished by the biofilter 118 (e.g., a fluidized bed filter, a mixed bend filter, a trickling filter, a rotating biocontactor, a membrane bioreactor, etc.). The biofilter 118 provides ammonia removal by a biological filter (nitrification) which consists of the successive oxidation of ammonia to nitrite ($NO_2^-$) and finally to nitrate ($NO_3^-$). The process is usually actuated by autotrophic bacteria via an aerobic biofilter process. The biofilter 118 may be a submerged biofilter, trickling biofilter, rotating biological contactor, floating bead biofilter, dynamic bead biofilter, fluidized-bed biofilter, and/or other type biofilter that is designed to complete nitrification and is associated with water quality, and combinations thereof. In some embodiments, the biofilter 118 may operate under a low-head moving bed biological reactor concept using bioreactor media to provide efficient biological filtration.

Figure 7:
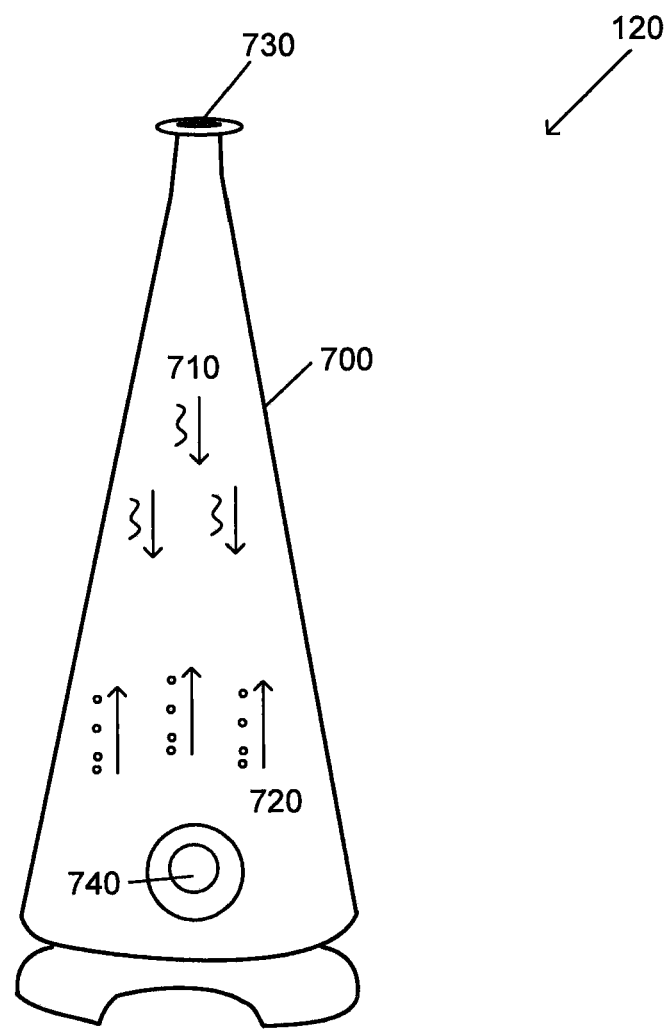
FIG. 7 is a front isometric view of an oxygen cone for use with the system of FIG. 1.

The biofilter 118 is in fluid communication with the oxygen cone 120 (shown in more detail in FIG. 7). The availability of dissolved oxygen (DO) is one factor that limits increased carrying capacity and production in aquaculture recirculation systems. Using only aeration as a means of providing dissolved oxygen, a typical aquaculture system can support only about 40 kg/m$^3$ of water. However, by using pure oxygen (e.g., supplied by the oxygen gas inlet 121) and high efficient gas transfer devices (e.g., the oxygen cone 120) to increase the amount of dissolved oxygen in the water column, stocking densities of the aquatic population may be increased to over about 120 kg/m$^3$ of water. For example, by increasing the DO concentration at the oxygen gas inlet 121 to the culture tank 112 from about 10 mg/L (aeration alone) to about 18 mg/L using pure oxygen, and assuming a DO concentration of about 6 mg/L at the discharge, the carrying capacity of the system may be increased by a factor of at least about three. Thus, instead of a concentration of DO of about 4 mg/L (10 mg/L minus 6 mg/L) being available for respiration and metabolism by the fish, DO in a concentration of about 12 mg/L becomes available (18 mg/L minus 6 mg/L). Moreover, use of suitable oxygen saturators may result in an increase in stocking densities from about 40 kg/m$^3$ to about 120 kg/m$^3$.

The aquaculture system 100 includes the oxygen cone 120 and/or oxygen saturators that may efficiently optimize gas transfer (e.g., of oxygen or ozone) in the water of the culture tank(s) 112. More specifically, the oxygen cone 120 uses the change in water velocity that occurs in different diameter pipes to ensure complete or substantially complete diffusion of pure oxygen bubbles. As shown in FIG. 7, water and oxygen flow downward (represented by 710) through the oxygen cone 120 decreasing water velocity as the diameter of the body of the oxygen cone 120 widens. Simultaneously, oxygen bubbles (represented by 720) from the downward oxygen flow (or that are injected into the bottom of the oxygen cone 120) rise upward against the counter flowing water 710 until the velocity of the downward flowing water 710 equals the speed of the oxygen bubbles rising 720, which allows the oxygen gas to slowly diffuse into the water. The oxygen cone 120 automatically generates a range of velocities of water and gas flow, which even with small fluctuations in water and gas flow, allows the oxygen gas to diffuse into the water.

The oxygen cone 120 further functions to increase gas pressure in order to overcome surface water tension and enable the oxygen to diffuse more easily into the water. The oxygen cone 120 comprises a cone shaped cylinder 700 (see FIG. 7) or a series of pipes with reducing diameters (not shown), constructed of fiberglass or other suitable material. The oxygen cone 120 includes an inlet 730 to provide fluid water and gas flow into the oxygen cone 120 from the biofilter 118. The oxygen cone 120 further includes an outlet 740 to provide fluid communication with the air blower 124. Absorption efficiency of the oxygen cone 120 may range from about 95% to about 100% with effluent concentrations from about 30 mg/L to about 90 mg/L. In some systems, the oxygen cone 120 may transfer from about 0.2 kilograms of oxygen per hour to about 4.9 kilograms of oxygen per hour at about 25 mg/L, at oxygen flow rates from about 170 L/min to about 2,300 L/min.

The aquaculture system 100 further includes the regenerative air blower (e.g., the air blower 124) that is in fluid communication with the oxygen cone 120. Diffuser-based aeration increases gas exchange by providing increased surface area of the gas/water interface at the bubble surface. Diffuser-based aeration also stirs the water, which thins the stagnant boundary layer at the bubbles and the top of the water. A primary method of creating diffuser-based aeration is to move the air. The air blower 124 is designed to provide large volumes of air (e.g., from about 0.37 m$^3$/min to about 36.1 m$^3$/min) at low pressures (less than about 27.58 KPa)

and is commonly used in conjunction with one or more of air diffusers and/or air lifts. The combination of the air blower 124 with one or more air diffusers adds oxygen and removes carbon dioxide with relatively low power consumption. The air blower 124 uses energy to move more air at lower pressure rather than less air at higher pressure. For example, the air blower 124 may include a motor having about 2.5 hp (not shown) that moves air at about 3.4 m$^3$/min at about 103.4 KPa, or may operate in corrosive environments and deliver oil-free air, for example, to water in the biofilter 118. The air blower 124 may comprise an outer casing with a corrosion resistant metal fan and includes both input and output valves. The input and output valves of the air blower 124 may be provided with filtering baffles and materials that aid in the elimination of noise and vibration reduction.

Figure 8:
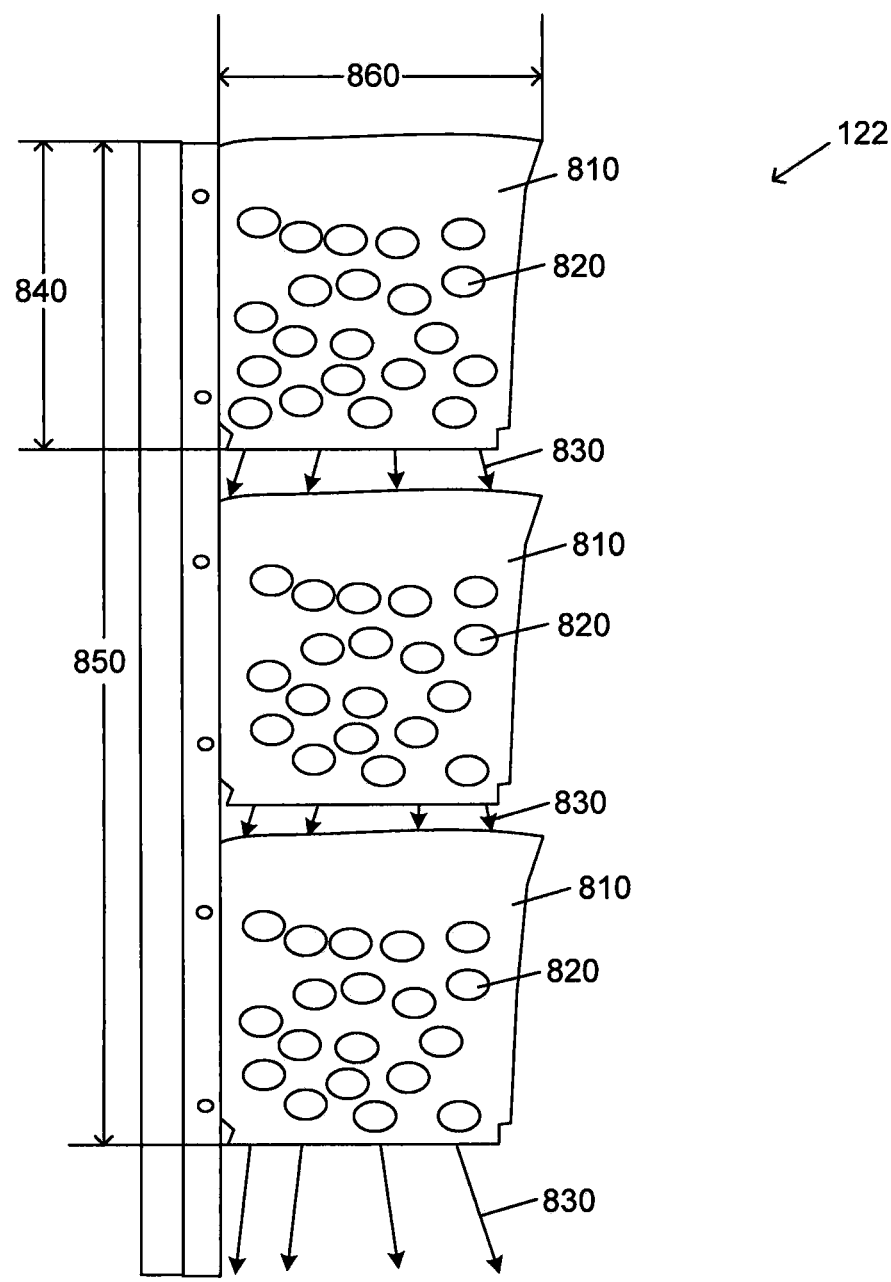
FIG. 8 is a schematic representation of a gas diffusing column or gas diffuser for use with the system of FIG. 1.

The air blower 124 is in fluid communication with a degassing column (e.g., the degasser 122). As shown in FIG. 8, the degasser 122 generally includes at least one of a plurality of subsegments 810 that is filled with a packing medium 820. The subsegment 810 may be manufactured of suitable materials that are inert and not reactive with water. For example, subsegment 810 may be manufactured of rubber, polymers, polyethylene, heavy duty polyethylene, heavy duty UV-resistant polyethylene, or the like, and/or combinations thereof. The subsegment 810 may be in fluid communication with at least one other of the plurality of subsegments 810. The packing medium 820 may have a large (above about 90 percent) void or empty space per unit volume and may be packed in a way that allows the water flow 830 to break up randomly into a thin film that trickles down through the degasser 122 and follows a circuitous pathway. A perforated support plate (not shown) supports the medium within the subsegment 810 at the bottom of the degasser 122. Near the top of the degasser 122, a water distribution plate (not shown) with a plurality of holes is placed over the packing medium 820.

The degasser 122 may have a height parameter 850 that may be based on a number of design criteria and may be dependent upon the characteristics of the incoming water. For example, the height parameter 850 may be selected for the degasser 122 to provide at least 90 percent saturation of water with dissolved oxygen. Similarly, a required segment diameter 860 of the degasser 122 depends on water flow rate. For example, water flow rates to the degasser 122 may range from about 0.15 m$^3$/min to about 0.57 m$^3$/min, with the segment diameter 860 generally up to about 30.5 cm or up to about 45.7 cm. For example, the degasser 122 may have a water flow rate of about 0.38 m$^3$/min to about 0.57 m$^3$/min and a segment diameter 860 of about 30.5 cm to about 45.7 cm. In one embodiment, each subsegment 810 of the degasser 122 may have a segment height 840 of about 45.7 cm, a segment diameter 860 of about 40.6 cm with a water flow loading capacity of about 0.57 m$^3$/min, and may be substantially packed with about 0.017 m$^3$ of suitable packing medium 820 such as plastic, polyethylene, black polyethylene, or the like, and/or combinations thereof. In additional embodiments, each subsegment 810 of the degasser 122 may have a segment height 840 of about 20 cm, about 30 cm, about 40 cm, about 50 cm, or about 60 cm; each subsegment 810 of the degasser 122 may have a segment diameter 860 of about 30 cm, about 40 cm, about 50 cm, about 60 cm, or about 70 cm with a water flow loading capacity of about 0.10 m$^3$/min, about 0.20 m$^3$/min, about 0.30 m$^3$/min, about 0.40 m$^3$/min, about 0.50 m$^3$/min, about 0.60 m$^3$/min, or about 0.70 m$^3$/min and may be substantially packed with about 0.005 m$^3$, about 0.010 m$^3$, about 0.020 m$^3$, or about 0.025 m$^3$, of suitable packing medium 820.

The degasser 122 is used for removing nitrogen, hydrogen sulfide, carbon dioxide, other gases, and/or a combination thereof from water. The degasser 122 may also add oxygen to undersaturated water. In the recirculating aquaculture system 100, where oxygen is used, carbon dioxide levels may rise to narcotic or toxic levels. The packed segments 810 of the degasser 122 may serve two roles, depending upon the quality of incoming water. For example, if water is supersaturated with dissolved gases, the degasser 122 may substantially relieve the supersaturated condition. Additionally, for instances where the dissolved oxygen level of the water is low, the degasser 122 may substantially saturate the water with dissolved oxygen.

The aquaculture system 100 includes the plurality of valves 126, which are used to regulate the flow and/or pressure of water and/or gas within the culture tank 112. The plurality of valves 126 may include, but are not limited to, water proportional control valves 126A (see FIG. 1), oxygen gas proportional control valves 126B (see FIG. 1), and other control valves that are designed to regulate the flow and/or pressure of water and/or gas or air associated with water quality, and combinations thereof. For example, each of the plurality of valves 126 may include actuators and/or positioners to open and close the valves in order to regulate the flow and/or pressure therethrough.

The aquaculture system 100 also includes the plurality of sensors 128. The plurality of sensors 128 are used to detect levels of at least one of oxygen, nitrite, ammonia, carbon dioxide, other analytes, and the like, and combinations thereof, within the water of, or related to, the culture tank 112. The plurality of sensors 128 may be positioned throughout the system and are in communication with the controllers 116 and/or 316 for monitoring one or more parameters of the system. Parameters of the system may include, but are not limited to, dissolved oxygen, nitrite, ammonia, carbon dioxide, water flow rate, oxygen gas flow rate, oxygen gas pressure, water pressure sensors, suspended solids, undissolved oxygen, nitrate, temperature, pH, salinity, conductivity, oxidation-reduction potential (ORP), turbidity, atmospheric pressure, water level, saturation, alkalinity, and other water quality parameters known in the art. Some parameters, such as dissolved oxygen, carbon dioxide, ammonia, temperature, may be measured directly from the sensors 128 (e.g., digital probes or potentiometers). Other parameters, such as alkalinity, saturation, etc. may be measured or calculated indirectly by the controllers 116 and/or 316 (e.g., through equations and/or stored lookup tables) using outputs from the sensors 128 (e.g., optical sensors, ultrasonic sensors, infrared sensors, etc.). The plurality of sensors 128 may include, but are not limited to, water quality probes 128A, water flow rate sensors 128B, oxygen gas flow rate and pressure sensors 128C, water pressure sensors 128D, and other sensors that are designed to detect one or more analytes or parameters associated with water quality, and combinations thereof.

In some embodiments, the water quality probes 128A may include bare electrode cell and membrane cell analytical sensors. For example, for disinfectant measurement, the water quality probes 128A may include a three-electrode sensor that eliminates the need for zero-adjustment as in conventional sensors. Hydrodynamic grit cleaning of the electrode surfaces maintains sensitivity to extend the intervals between calibrations. In another embodiment, the water quality probes 128A may include an internally buffered membrane type sensor to eliminate the need for separate reagents for free and substantially total chlorine measurement, or when water exhibits fluctuating pH. In yet another embodiment, the water quality probes 128A may include a flow cell assembly comprising a corrosion-proof acrylic housing, a transparent flow chamber, a pressure gauge, a sample valve, a flow switch, isolations valves, and combinations thereof for pH and oxidation-reduction potential (ORP) measurements.

The water flow rate sensors 128B and the oxygen gas flow rate sensors 128C may comprise mechanical flow meters that use positive-displacement flow meters to accumulate a fixed volume of fluid or gas and then count the number of times the volume is filled to measure flow. The water flow rate sensors 128B and the oxygen gas flow rate sensors 128C may comprise pistons reciprocating in cylinders, gear teeth mating against the internal wall of the meter through a progressive cavity created by rotating oval gears, a helical screw, other suitable water/gas flow rate sensor, or combinations thereof. For example, the water flow rate sensors 128B and the oxygen gas flow rate sensors 128C may comprise mechanical flow meters such as piston meters, gear meters, oval gear meters, helical gear meters, nutating disk meters, variable area meters, turbine flow meters, Woltmann meters, single jet meters, paddle wheel meters, multiple jet meters, Pelton wheels, current meters, other suitable water/gas flow rate sensors, or combinations thereof.

In another embodiment, the water flow rate sensors 128B and the oxygen gas flow rate sensors 128C may comprise sensors that rely on forces produced by the flowing stream as the water or gas flow overcomes a known constriction to indirectly calculate flow rate. In yet another embodiment, the water flow rate sensors 128B and the oxygen gas flow rate sensors 128C may measure flow by measuring the velocity of fluid or gas over a known area. In other embodiments, the water flow rate sensors 128B and the oxygen gas flow rate sensors 128C may comprise pressure-based meters, optical flow meters, open channel flow meters, thermal mass flow meters, vortex flow meters, electromagnetic flow meters, ultrasonic flow meters, Coriolis flow meters, laser Doppler flow meters, other suitable water flow rate or gas flow rate sensors associated with water quality, or combinations thereof.

The oxygen gas pressure sensors 128C and the water pressure sensors 128D may comprise force collector type sensors or other suitable pressure sensors. Force collector type sensors use a force collector such as a diaphragm, piston, bourdon tube, bellows, or combinations thereof to measure strain (or deflection) due to applied pressure force over an area. The oxygen gas pressure sensors 128C and the water pressure sensors 128D may comprise piezoresistive strain gauges that use the piezoresistive effect of bonded or formed strain gauges to detect strain due to applied pressure. Piezoresistive strain gauges employ a few common types of technologies including silicon (monocrystalline), polysilicon thin film bonded metal foil, thick film, sputtered thin film, or the like, or combinations thereof. Generally, the strain gauges are connected to form a Wheatstone bridge circuit to maximize the output of the sensors and to reduce sensitivity to errors. Generally, these technologies are suited to measure absolute, gauge, vacuum, differential pressures, or combinations thereof. In other embodiments, the oxygen gas pressure sensors 128C and the water pressure sensors 128D may comprise capacitive sensors, electromagnetic sensors, piezoelectric sensors, optical sensors, potentiometric sensors, resonant sensors, thermal sensors, ionization sensors, other suitable water pressure or gas pressure sensors, or combinations thereof.

The component parts having been described, operation of the aquaculture system 10 will now be discussed. More particularly, water may be recirculated through the aquaculture system 100 using the variable speed pump 114, (i.e., through the fluid circuit) for treatment to ensure optimal aquatic life conditions within the culture tank 112.

Components of the aquaculture system 100 including the culture tank 112, the variable speed pump 114, the biofilter 118, the degasser 122, and the oxygen cone 120 may form a fluid circuit in which the treated water is circulated. In addition, one or more components of the aquaculture system 100 including the variable speed pump 114, the biofilter 118, the oxygen cone 120, the oxygen gas inlet 121, the degasser 122, the air blower 124, the plurality of control valves 126, the plurality of sensors 128, or any combination thereof may be in fluid communication with and/or automatically operated by one or more of the controllers 116, 316, 600.

Figure 9:
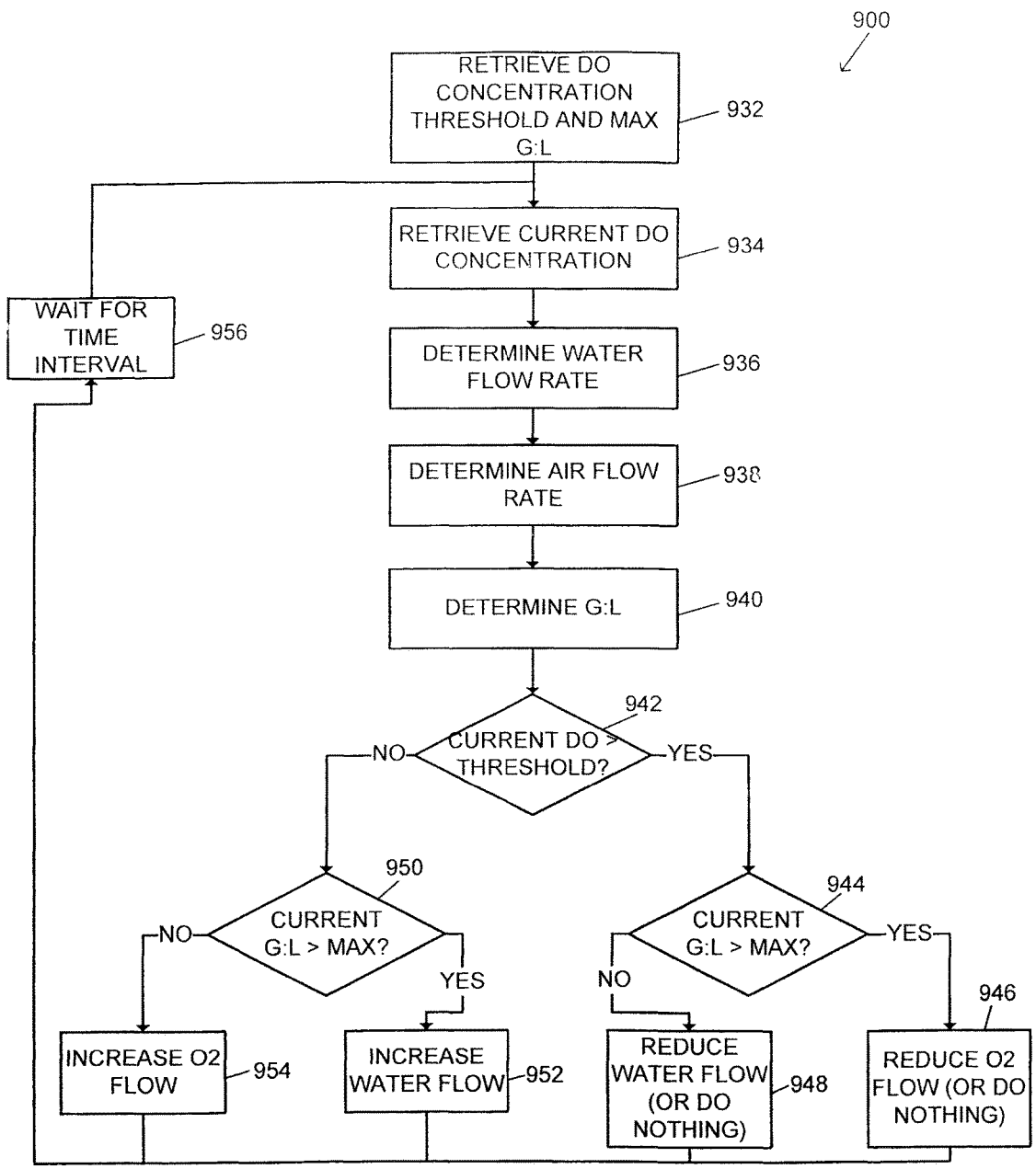
FIG. 9 is a flow chart illustrating a method for controlling dissolved oxygen in a recirculating aquaculture system.

FIG. 9 illustrates a method 900 (e.g., as executed by the controller 116) for controlling dissolved oxygen levels in the aquaculture system 100. As shown in FIG. 9, the method 900 may include the step of retrieving a threshold dissolved oxygen level and a maximum G:L (at step 932). The controller 116 may retrieve the maximum dissolved oxygen level threshold and the maximum G:L ratio from lookup tables (at step 932), for example, based on aquatic life species, age (i.e., growth cycle), size, mass, or other characteristics, from user input, or a combination thereof. The controller 116 may then retrieve a current dissolved oxygen level (at step 934), for example, from the oxygen sensor 128 in the culture tank 112, at an output of the oxygen cone 120, or some combination thereof. The controller 116 may also determine or retrieve the current water flow rate (at step 936), determine or retrieve the current air flow rate (at step 938), and calculate the current G:L ratio (at step 940).

Following step 940, the controller 116 may compare the current dissolved oxygen level with the threshold dissolved oxygen level (at step 942). If the current dissolved oxygen level is greater than the threshold dissolved oxygen level, as determined at step 942, the controller 116 may then compare the current G:L ratio to the maximum G:L ratio (at step 944). If the current G:L ratio is greater than the maximum G:L ratio, as determined at step 944, the controller 116 may reduce oxygen flow through the aquaculture system 100 (at step 946) for a time period sufficient to lower the current G:L ratio to a value that is less than the maximum G:L ratio. In some embodiments, the reduction in oxygen flow through the aquaculture system 100 (at step 946) may result in decreasing the value of the current dissolved oxygen level within the aquaculture system 100 to a value less than the threshold dissolved oxygen level as determined at step 932. Alternatively, in other embodiments where the current G:L ratio is greater than the maximum G:L ratio, as determined at step 944, the controller 116 may elect to refrain from executing an action (i.e., "do nothing") at step 946 and proceed to step 956. If the current G:L ratio is less than the maximum G:L ratio, as determined at step 944, the controller 116 may reduce the current water flow rate by decreasing a speed of the variable speed pump 114 (at step 948) for a time sufficient to increase the current G:L ratio to a value greater than the maximum G:L ratio. In other embodiments where the current G:L ratio is less than the maximum G:L ratio, as determined at step 944, the controller 166 may alternatively elect to refrain from executing an action (i.e., "do nothing") and proceed to step 956.

If the current dissolved oxygen level is less than the threshold dissolved oxygen level, as determined at step 942, the controller 116 may then compare the current G:L ratio to the maximum G:L ratio (at step 950). If the current G:L ratio is greater than the maximum G:L ratio, as determined at step 950, the controller 116 may increase the current water flow rate by increasing a speed of the variable speed pump 114 (at step 952) for a time period sufficient to lower the current G:L ratio to a value that is less than the maximum G:L ratio. If the current G:L ratio is less than the maximum G:L ratio, as determined at step 950, the controller 116 may increase oxygen flow through the aquaculture system 100 (at step 954) for a time period sufficient to raise the current G:L ratio to a value that is greater than the maximum G:L ratio. Such an increase in oxygen flow may result in raising the value of the current dissolved oxygen level within the aquaculture system 100 to a value greater than the threshold dissolved oxygen level as determined at step 932. Following execution of the necessary action (e.g., at step 946, 948, 952, or 954), the controller 116 may wait for a predetermined time period (at step 956) and then revert back to step 934 to retrieve a new current dissolved oxygen level and repeat the above process. In some embodiments, a flow control algorithm may be used to operate the variable speed pump 114 to maintain the current water flow rate after it has been adjusted (i.e., increased or decreased).

The predetermined time period at step 956 may be a suitable time period to allow the aquaculture system 100 to reach steady state conditions reflecting any actions taken by the controller 116. For example, the predetermined time period may be based on a number of variables such as, but not limited to, a volume of the culture tank 112, a magnitude of action taken (e.g., a longer time period for larger flow increases vs. a shorter time period for smaller flow increases), energy optimization (e.g., minimizing unnecessary process iterations and actions taken during on-peak hours), feeding or rest times of the aquatic life (e.g., increasing process iterations and actions taken, by selecting a shorter time period, during feeding times and decreasing process iterations and actions taken, by selecting a longer time period, during rest times). In some embodiments, a lookup table of time periods may be stored by the controller 116, and the controller 116 may determine the appropriate time period based on one or more of the variables discussed above. In addition, water flow rate may be decreased or increased (i.e., at step 948 or step 952, respectively) over a time period to allow a gradual or incremental ramping of the speed of the variable speed pump 114. For example, the controller 116 may determine to execute an increase amount in the current water flow rate, by less than about 1%, about 1%, about 2%, about 3%, about 4%, about 5% or less than about 10% of the current water flow rate, and subsequently gradually ramp up the speed of the variable speed pump 114 until the increased current water flow rate is substantially reached at step 952.

In addition to stored predetermined time periods, the controller 116 may store lookup tables of threshold dissolved oxygen levels and maximum G:L ratios. In some embodiments, the stored threshold dissolved oxygen levels and maximum G:L ratios may be input by a user (e.g., through a user interface of the controller 116) and stored in the lookup tables of the controller 116. In other embodiments, the controller 116 may include pre-stored lookup tables. In further embodiments, the controller 116 may be in communication with a network and is capable of downloading lookup tables. The controller 116 may select the threshold dissolved oxygen levels and maximum G:L ratios from the lookup tables based on a number of factors, such as species, size and/or age (i.e., growth cycle) of aquatic life, feeding cycles, and/or resting cycles, or a combination of these factors. For example, aquatic life may require higher dissolved oxygen levels during feeding cycles.

Referring again to FIG. 1, in some embodiments, the controller 116 may execute one or more different actions to adjust oxygen flow through the aquaculture system 100. For example, with respect to increasing oxygen flow (i.e., to raise the current dissolved oxygen level above the threshold oxygen level), a first action includes adding air into the water by increasing the air fed into the degasser 122 (e.g., by turning on and/or increasing a speed of the air blower 124). Other actions may include adding water into the air (i.e., aeration) through bubble diffusion, paddle wheel aerators, aspirators, propeller aerators, diffused aeration by disk diffuser, or the like, and any combination thereof. Another action may include adding oxygen through the oxygen cone 120 or an oxygen saturator (e.g., by automatically adjusting the proportional control valve 126 at the oxygen cone 120). Yet another action may include adding oxygen directly via the oxygen inlet 121, an oxygenator, a tank diffuser, or a combination thereof. In some embodiments, these actions may be selected to minimize operating costs in the aquaculture system 100. For example, the controller 116 may select to add oxygen only during off-peak times (e.g., at night) to reduce oxygen costs.

In some embodiments, the controller 116 may include one or more stored hierarchical lists of actions for execution. In an embodiment, the controller 116 may execute a second action from the one or more stored the hierarchical lists should a number of process iterations of a first action fail to increase the current dissolved oxygen level above the threshold dissolved oxygen level. The controller 116 may then execute a third action if the second action fails, and so on. In one embodiment, the one or more stored hierarchical lists may include oxygenation through the oxygen cone 120 or saturator as a first action, aeration through the biofilter 118 as a second action, aeration through the degasser 122 as a third action, and oxygenation through the oxygen inlet 121, an oxygenator, a tank diffuser, or a combination of these actions as a fourth action. In some embodiments, the controller 116 may include a number of hierarchical lists based on the calculated difference between the current dissolved oxygen level and the threshold dissolved oxygen level. For example, if the current dissolved oxygen level is dangerously low as compared to the threshold dissolved oxygen level (i.e., there is a large difference between the current level and the threshold dissolved oxygen level), the controller 116 may first add oxygen directly via the oxygen inlet 121, an oxygenator, a tank diffuser, or a combination thereof based on the calculated difference between the current dissolved oxygen level and the threshold dissolved oxygen level. Furthermore, in some embodiments, water pressure in the aquaculture system 100 may be monitored and variably adjusted instead of dissolved oxygen levels. For example, the controller 116 may adjust the valves 126 positioned at an output of oxygen saturators (e.g., the oxygen inlet 121, the degasser 122, or the oxygen cone 120) to increase the water pressure of the aquaculture system 100 when the current dissolved oxygen level is below the threshold dissolved oxygen level. To maintain water flow rates in the aquaculture system 100 (i.e., in accordance with the flow control algorithm described above) when the water pressure is increased, the controller 116 may also automatically increase pump speed via the variable speed pump 114. In some embodiments, the controller 116 or a user may select to operate under a water pressure monitoring model or a water flow monitoring model based on efficiency of the variable speed pump 114 and energy consumption of the motor 314.

In addition, in some embodiments, the controller 116 may monitor and/or store the current dissolved oxygen level and the actions taken over time. For example, the controller 116 may monitor the time period that the current dissolved oxygen level stays below the threshold dissolved oxygen level. If the controller 116 fails to increase the dissolved oxygen level above the dissolved oxygen level threshold after a specific number of consecutive process iterations or after a predetermined time period, the controller 116 may initiate an alarm (e.g., an audible and/or visual alarm) to alert an operator.

In further embodiments, the controller 116 may include a stored hierarchical list of parameters for optimization. The controller 116 may simultaneously receive one or more actions for execution based on control processes for each of the parameters delineated on the hierarchical list. However, the controller 116 may initially execute actions to optimize the parameter of highest priority. For example, the hierarchical list may include the following prioritized parameters (i.e., in order of priority): dissolved oxygen, ammonia, nitrite, carbon dioxide, pH, and temperature. As a result, the controller 116 may prioritize actions to optimize the current dissolved oxygen level (as the highest prioritized parameter) over other parameters. Additionally, temperature monitoring may also be incorporated into the dissolved oxygen control methods described above because the solubility of oxygen in water is temperature dependent.

Suitable water treatment may include one or more of carbon dioxide removal, disinfection, biological filtration, nitrification, waste solids removal, aeration, oxygenation, fine and dissolved solids removal, other suitable water quality treatments known in the art, and any combination thereof using the components described above and/or additional components.

Referring back to FIG. 1, the aquaculture system 100 may include additional components. For example, in some embodiments, rotating drum filters may be used for high-volume solids removal and a radial flow setter may be used to capture settable solids from the bottom drain of a dual drain system for solids removal. In some embodiments, the aquaculture system 100 of FIG. 1 may optionally include an ultraviolet (UV) sterilizer, an ozone generator, or any combination thereof. Disinfection may be accomplished by the ultraviolet (UV) sterilizer and/or the ozone generator. In some embodiments, the aquaculture system 100 of FIG. 1 may further include swirl separators, screen filters, bead filters, rotating drum filters, a double drain mechanism, or any combination thereof. Waste solids removal may be accomplished through sedimentation, using the swirl separators, the screen filters, the bead filters, the rotating drum filters, the double drain mechanism, or any combination thereof. In some embodiments, the aquaculture system 100 of FIG. 1 may include a protein skimmer, also referred to as a foam fractionator, which may be used to remove dissolved solids, including any fine particulates that mechanical filtration does not catch. These dissolved solids are usually proteins that have broken down from wastes, uneaten food, and dead fish.

Although the controller 116 is described throughout, one or more of the controllers 116, 316, and/or 600 may perform one or more of the functions associated with the controller 116.

Although numerous embodiments have been provided with respect to various components of the system 100, it should be apparent that one or more components may be omitted and/or additional components may be added to the system 100. Additionally, other types of the culture tank 112, the variable speed pump 114, the controller 116, the biofilter 118, the oxygen cone 120, the oxygen gas inlet 121, the degasser 122, the air blower 124, the plurality of control valves 126, and the plurality of sensors 128 may be used as known in the art, consistent with the disclosure as set forth herein.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A method for controlling dissolved oxygen in an aquaculture system, the aquaculture system including a culture tank that houses aquatic life, the method comprising:
   circulating water through the culture tank at a water flow rate;
   providing oxygen at an oxygen flow rate independent of the water flow rate;
   retrieving a dissolved oxygen threshold concentration and a maximum gas to liquid ratio;
   measuring a current dissolved oxygen level;
   comparing, via a controller, the current dissolved oxygen level with the dissolved oxygen threshold concentration;
   the controller configured to perform one of the following steps:
      step a) when the current dissolved oxygen level is less than the dissolved oxygen threshold concentration,
         calculating, via the controller, a current gas to liquid ratio using a current water flow rate through the culture tank and a current oxygen flow rate;
         increasing the current water flow rate to increase the current dissolved oxygen level by increasing a speed of a variable speed pump when the current gas to liquid ratio is greater than the maximum gas to liquid ratio;
         increasing the current oxygen flow rate to increase the current dissolved oxygen level when the current gas to liquid ratio is less than the maximum gas to liquid ratio,
      or step b) when the current dissolved oxygen level is greater than the dissolved oxygen threshold concentration,
         calculating a current gas to liquid ratio using a current water flow rate and a current oxygen flow rate;
         decreasing the current oxygen flow rate when the current gas to liquid ratio is greater than the maximum gas to liquid ratio; and
         decreasing the current water flow rate by reducing a speed of a variable speed pump when the current gas to liquid ratio is less than the maximum gas to liquid ratio; and waiting a predetermined time period, then again retrieving a dissolved oxygen threshold concentration and repeating the method steps.

2. The method of claim 1, wherein increasing the current water flow rate comprises increasing the current water flow rate by at least one of about 1% to about 4%.

3. The method of claim 1 further comprising using a water flow control algorithm to operate the variable speed pump to maintain the current water flow rate after it has been increased.

4. The method of claim 1 further comprising determining an increase amount of one of the current water flow rate and the current oxygen flow rate based on at least one of time of day, feeding cycle of the aquatic life, and rest cycle of the aquatic life.

5. The method of claim 1, wherein increasing the current water flow rate includes ramping up the speed of the variable speed pump until an increase amount is reached.

6. The method of claim 1, wherein providing oxygen includes providing air to a degasser in the culture tank.

7. The method of claim 1, wherein providing oxygen includes injecting oxygen into an oxygen cone in communication with the culture tank.

8. The method of claim 1, wherein increasing the current oxygen flow rate includes one of increasing air to a degasser in the culture tank, aerating water to the culture tank, adding oxygen through an oxygen cone in communication with the culture tank, and adding oxygen through an oxygen inlet.

9. The method of claim 1, further comprising initiating an alarm when the current dissolved oxygen level is less than the dissolved oxygen threshold concentration for greater than a second predetermined time period.

* * * * *